US 8,556,019 B2

(12) United States Patent
Kuroki

(10) Patent No.: US 8,556,019 B2
(45) Date of Patent: Oct. 15, 2013

(54) HYBRID SADDLE-TYPE VEHICLE

(75) Inventor: Masahiro Kuroki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/581,183

(22) PCT Filed: Mar. 23, 2010

(86) PCT No.: PCT/JP2010/054965
§ 371 (c)(1),
(2), (4) Date: Aug. 24, 2012

(87) PCT Pub. No.: WO2011/117966
PCT Pub. Date: Sep. 29, 2011

(65) Prior Publication Data
US 2012/0318601 A1 Dec. 20, 2012

(51) Int. Cl.
*B62K 11/00* (2013.01)
*B62M 7/12* (2006.01)
(52) U.S. Cl.
CPC ...................................... *B62M 7/12* (2013.01)
USPC ......................................................... 180/220
(58) Field of Classification Search
CPC ............ B60K 6/485; B60K 7/00; B62M 7/12
USPC .................................................. 180/220, 226
See application file for complete search history.

(56) References Cited

U.S. PATENT DOCUMENTS 7,210,550 B2 * 5/2007 Yonehana et al. ............ 180/220

FOREIGN PATENT DOCUMENTS

| CN | 201183586 Y | 1/2009 | |
|---|---|---|---|
| EP | 1550795 A1 | 7/2005 | |
| EP | 2 340 953 A1 | 7/2011 | |
| JP | 8-175473 A | 7/1996 | |
| JP | 08175473 A * | 7/1996 | ................. 180/65.25 |
| JP | 08175474 A | 7/1996 | |
| JP | 3660466 B2 | 6/2005 | |
| JP | 2008-44588 A | 2/2008 | |
| JP | 3157836 U | 3/2010 | |
| WO | WO 99/29561 A1 | 6/1999 | |
| WO | WO 2009/047806 A2 | 4/2009 | |
| WO | WO 2012/045267 A1 | 4/2012 | |

OTHER PUBLICATIONS

JP_08175473, Isaka, Yoshiharu, Jul. 1996, (Machine Translation).*

* cited by examiner

*Primary Examiner* — J. Allen Shriver, II
*Assistant Examiner* — Felicia L Brittman
(74) *Attorney, Agent, or Firm* — Birch, Stewart, Kolasch & Birch, LLP

(57) ABSTRACT

A hybrid saddle-type vehicle is provided with a drive power transmitting mechanism for transmitting a power of an internal combustion engine from one side of a swing arm in a widthwise direction of a vehicle to a drive shaft of a rear wheel and an electric motor for transmitting a driving force from the other side in the widthwise direction to the drive shaft. One end portion in the widthwise direction extending in an axial direction from a motor housing accommodating a stator and a rotor of the electric motor is fitted with an outer hub in a radially contacting manner, and a rotating shaft of the electric motor is connected to the drive shaft to transmit the driving force.

8 Claims, 8 Drawing Sheets

HYBRID SADDLE-TYPE VEHICLE

TECHNICAL FIELD

The invention relates to a hybrid saddle-type vehicle.

BACKGROUND ART

A hybrid motorcycle including a forcedly-air-cooled engine and a drive motor and in which respective driving torques are appropriately selected and transmitted to a rear wheel has been proposed hitherto (for example, see Patent Document 1). The hybrid motorcycle disclosed in Patent Document 1 includes a transmission case equipped with a transmission mechanism for transmitting a driving force from an engine to the rear wheel. The transmission case is formed integrally with a crankcase of the engine, and is disposed on a left side of a vehicle body. Further, an electric motor is disposed back and forth in a horizontal direction at a right side of the vehicle body, and a motor case is supported to the crankcase through a bracket. The driving force of the engine is transmitted to an axle of the rear wheel via the transmission mechanism. By manually operating a switching lever, a driving force of the electric motor is transmitted to the axle of the rear wheel via a bevel gear, a speed reduction mechanism, and a power switching mechanism.

PRIOR ART DOCUMENT

Patent Document

[Patent Document 1] JP-B2-3660466

SUMMARY OF INVENTION

Problems to be Solved by the Inventions

The hybrid motorcycle disclosed in Patent Document 1 has a problem in that, since a large space is required at the right side of the vehicle body to install the bevel gear, the speed reduction mechanism, and the power switching mechanism which transmit the driving force of the electric motor, and a muffler in addition to the electric motor, a size or an output of the electric motor is limited in terms of layout. Further, there is another problem in that since the driving force of the electric motor is transmitted via a plurality of mechanism such as the bevel gear, the speed reduction mechanism, and the power switching mechanism, a mechanical loss occurs during transmitting the power.

The inventions have been made to solve the above-mentioned problems, and an object of the inventions is to provide a hybrid saddle-type vehicle in which a driving mechanism for an electric motor can be disposed in a compact size so as to improve a design freedom and an output of the electric motor is increased.

Means for Solving the Problems

In order to attain the object, according to the invention of claim 1, a hybrid saddle-type vehicle is provided with: a rear-wheel supporting member swingably attached to a body frame and adapted to support a rear wheel; a drive power transmitting mechanism adapted to transmit a power of an internal combustion engine from one side of the rear-wheel supporting member in a widthwise direction of a vehicle to a drive shaft of the rear wheel; and an electric motor adapted to transmit a driving force from the other side of the rear-wheel supporting member in the widthwise direction to the drive shaft. A wheel of the rear wheel includes a wheel hub portion having an inner cylindrical hub provided on a side of the drive shaft and a cylindrical outer hub provided in a radially outer side of the inner hub. The electric motor includes a motor housing accommodating a stator and a rotor therein, and a rotational shaft extending from the motor housing and fitted in the drive shaft. One end portion of the motor housing in the widthwise direction is supported on the outer hub via a bearing which is fitted with the outer hub in a radially contacting manner, and the motor housing is fixedly connected to the rear-wheel supporting member by a connection member.

According to the invention of claim 2, in addition to the configurations of claim 1, the rear-wheel supporting member is a swing arm which is swingably supported on the body frame via a pivot shaft.

According to the invention of claim 3, in addition to the configurations of claim 2, the motor housing is disposed in a rearward of the pivot shaft and in an inward of an end portion of the pivot shaft.

According to the invention of claim 4, in addition to the configurations of claim 2 or 3, the connection member is disposed in an upward of a bottom surface of the swing arm.

According to the invention of claim 5, in addition to the configurations of one of claims 2 to 4, the swing arm includes a first arm portion extending to a lateral side of the rear wheel from one side of a support portion which supports the pivot shaft in the widthwise direction, a second arm portion extending to a forward of the rear wheel from the other side of the support portion in the widthwise direction, and a cross portion connecting a rear portion of the second arm portion and the first arm portion, and the connection member is connected to a rear portion of the second arm portion from which the cross portion extends.

According to the invention of claim 6, in addition to the configuration of claim 1, the rear-wheel supporting member is a unit swing case which is swingably supported on the body frame via a link mechanism and covers the internal combustion engine.

According to the invention of claim 7, in addition to the configuration of any one of claims 1 to 6, the electric motor further includes a speed reduction mechanism adapted to decelerate the driving force and transmit it to the rotational shaft, and the rotor is rotatably supported around the rotational shaft, and the speed reduction mechanism is disposed on the other side of the rotational shaft in the widthwise direction.

Advantages of the Inventions

In accordance with the invention of claim 1, the electric motor includes a motor housing 90 accommodating a stator and a rotor therein, and a rotational shaft extending from the motor housing and fitted in the drive shaft, and one end portion of the motor housing in the widthwise direction of the vehicle is supported on the outer hub via a bearing which is fitted with the outer hub in the radially contacting manner. The motor housing is fixedly connected to the rear-wheel supporting member by a connection member. In this way, the unitized electric motor can be incorporated in the wheel of the rear wheel and be directly connected to the drive shaft of the rear wheel, so that the driving mechanism for the electric motor can be compact in size, and the design freedom of the electric motor can be improved as much as the size becomes compact. In addition, the driving force of the electric motor can be transmitted to the drive shaft of the rear wheel without passing through a plurality of transmission mechanisms, thereby suppressing the power loss in the transmission to a minimum.

In accordance with the invention of claim 2, since the rear-wheel supporting member is swingably supported on the body frame via the pivot shaft, it is possible to incorporate the electric motor into the swing arm in the hybrid saddle-type vehicle including the swing arm.

In accordance with the invention of the claim 3, since the motor housing is disposed rather rearward than the pivot shaft of the swing arm and rather inward than the end portion of the pivot shaft, the electric motor does not protrude from the vehicle, but is disposed in compact.

In accordance with the invention of claim 4, since connection member connecting the motor housing and the swing arm is disposed rather upward than the bottom surface of the swing arm, a minimum height-above-a-ground is not determined by the connection member, but the height-above-the-ground of the swing arm can be set to the minimum height-above-the-ground, such like the related art.

In accordance with the invention of claim 5, the swing arm includes the first arm portion extending from the support portion, which is supported on the pivot shaft, to the lateral side of the rear wheel, the second arm portion extending to the forward of the rear wheel, and the cross portion, and the connection member connecting the motor housing and the swing arm is connected to the rear portion of the second arm portion. Therefore, the rear wheel can be supported in the double-sided structure having high rigidity, and distortion of the swing arm can be prevented, thereby securing the safety of driving.

In accordance with the invention of claim 6, since the rear-wheel supporting member is the unit swing case which is swingably supported on the body frame via the link mechanism and covers the internal combustion engine, it is possible to incorporate the electric motor into the unit swing case in the hybrid saddle-type vehicle including the unit swing case.

In accordance with the invention of claim 7, since the rotor is rotatably supported on the rotational shaft of the electric motor, and the rotation of the rotor is decelerated by the speed reduction mechanism disposed outside the rotational shaft in the widthwise direction thereof and is then transmitted to the rotational shaft, the heavy rotor can be disposed on the center portion of the drive shaft in the axial direction thereof, thereby equalizing the load applied to the rotational shaft and suppressing the vibration of the rotational shaft.

DESCRIPTION OF EMBODIMENTS

A hybrid saddle-type vehicle according to each embodiment of the inventions will now be described with reference to the accompanying drawings. The drawings should be viewed in a position that permits a proper reading of the reference numbers included in the respective drawings.

First Embodiment

Figure 1:
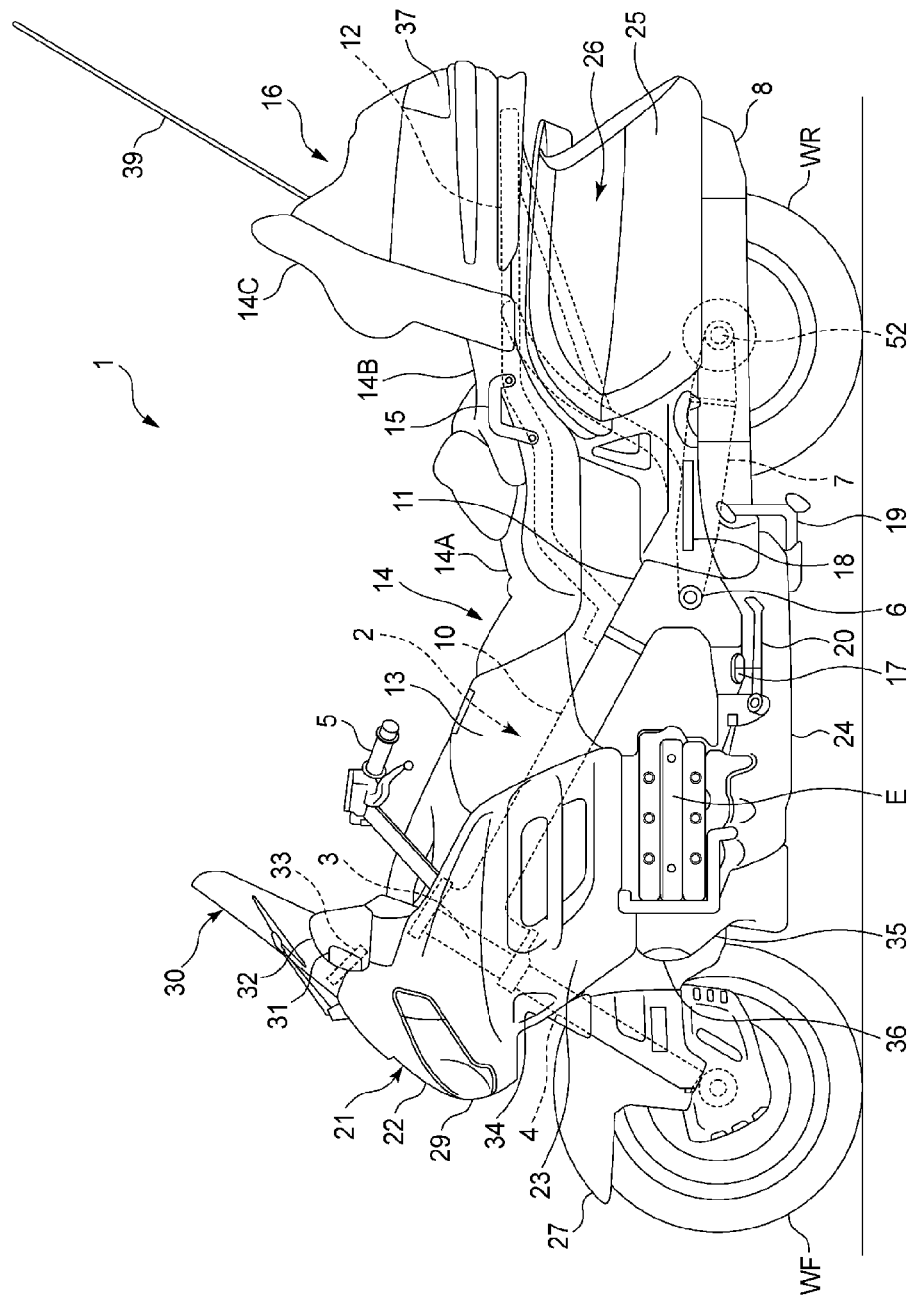
FIG. 1 is a side view illustrating a hybrid saddle-type vehicle according to a first embodiment of the inventions.
Figure 2:
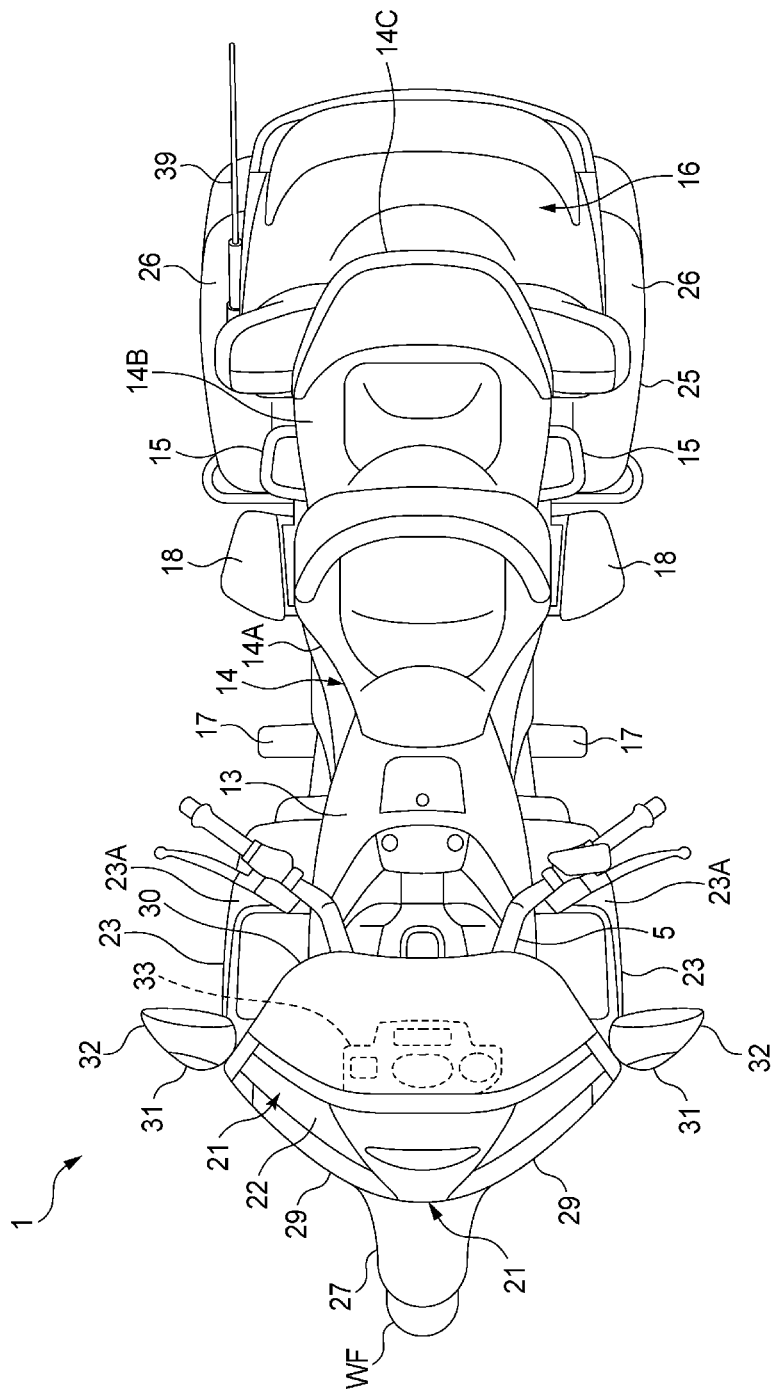
FIG. 2 is a plan view of the hybrid saddle-type vehicle illustrated in FIG. 1.

FIG. 1 is a side view illustrating the whole configuration of a hybrid saddle-type vehicle according to a first embodiment of the inventions, and FIG. 2 is a plan view of the hybrid saddle-type vehicle.

As illustrated in FIGS. 1 and 2, a large motorcycle 1 which is a hybrid saddle-type vehicle according to this embodiment, includes a body frame 2, a head pipe 3 fixed to a front end portion of the body frame 2, a front fork 4 pivotably mounted to the head pipe 3, a front wheel WF rotatably mounted to a lower end portion of the front fork 4, a steering handle 5 mounted to an upper end portion of the front fork 4, an engine (internal combustion engine) E positioned below a front portion of the body frame 2 and extending at a position rather rearward than the front fork 4, a swing arm 7 (rear-wheel supporting member) mounted swingably in an up-down direction to a pivot shaft 6 which is provided to a rear bottom portion of the body frame 2, a rear wheel WR rotatably mounted to a swing end portion of the swing arm 7, an exhaust muffler 8 connected to the engine E via an exhaust pipe (not illustrated), and a rear cushion 9 (see FIG. 3) disposed between the swing arm 7 and the body frame 2.

The body frame 2 includes a pair of left and right main frames 10 branched in a right and left direction from the head pipe 3s and extending backward and obliquely downward, a pair of left and right pivot plates 11 connected to a rear portion of the main frame 10, and a pair of left and right seat rails 12 extending backward and obliquely upwardly from front and rear portions of the pivot plates 11. The engine E is supported below the main frame 10, and a fuel tank 13 is supported above the main frame 10. Further, an occupant's seat 14 is attached to the upper portion of the seat rail 12, and a grab rail 15 and a trunk box 16 are attached to the rear portion of the seat rail 12.

The occupant's seat 14 includes a front seat 14A extending to a rear portion of the fuel tank 13, on which a rider sits, a rear seat 14B formed higher by one step than the front seat 14A at the rear portion of the front seat 14A, on which a pillion passenger sits, and a backrest 14C for the occupant. Further, the pivot plate 11 of the body frame 2 is attached with a pair of left and right steps (rider's foot-placed steps) 17 for the rider sitting on the front seat 14A, and with a pair of left and right steps (pillion passenger's foot-placed steps) 18 for the pillion passenger sitting on the rear seat 14B. In addition, a main stand 19, a sub stand 20, a body cowling 21 which will be described later, and others are attached to the body frame 2.

The body cowling 21 includes a front fairing 22 covering the vehicle body, a pair of left and right side covers 23 covering the lateral portions of the vehicle body, an undercover 24 covering the lower portion of the vehicle body, and a rear seat cowl 25 covering the rear portion of the vehicle body. The rear seat cowl 25 is formed integrally with a pair of left and right saddlebags 26. A front fender 27 is attached to the front fork 4 to cover the front wheel WF. A rear fender (not illustrated) is attached to the rear seat cowl 44 to cover the rear wheel WR. Meanwhile, the front fairing 22 and the pair of left and right side covers 23 may be formed in one piece. Further, one of the saddlebags 26 is received with a PDU (power drive unit) 28a and a battery 28b.

Headlights 29 are provided on the front surface of the front fairing 22, and a windscreen (windshield) 30 is attached above the headlights. Left and right mirrors 32 each incorporating a front blinker 31 are respectively provided at the left and right ends of the front fairing 22. As illustrated in FIG. 2, vehicle meters 33 are disposed inside the front fairing 22. The side covers 23 are respectively provided with a pair of left and right air openings 34 adapted to supply outside air from the front of the vehicle to the surrounding of the engine E. An engine guard 35 is provided at left-forward of and right-forward portions of the engine E, and a pair of left and right fog lamps 36 are attached to the engine guard 35.

The side covers 23 are attached with a pair of left and right upper covers (exterior cover) 23A (see FIG. 2) covering between the side cover 23 and the main frame 10 and exposed from the exterior. The side upper covers 23A interrupt the heat generated from the engine E from flowing to the passenger side via a gap between the side covers 23 and the body frame 2. The side upper covers 23A also serve as a decorative cover covering the upper portion of a radiator (not illustrated). Further, a pair of left and right tail lamp units 37 is disposed on a rear surface of the trunk box 16, and a rear blinker (not illustrated) is disposed on a rear surface of the respective saddlebags 26. A right portion of the trunk box 16 is attached with a road antenna 39 used when an audio unit (not illustrated) incorporated in the large motorcycle 1 receives a radio broadcast.

Figure 3:
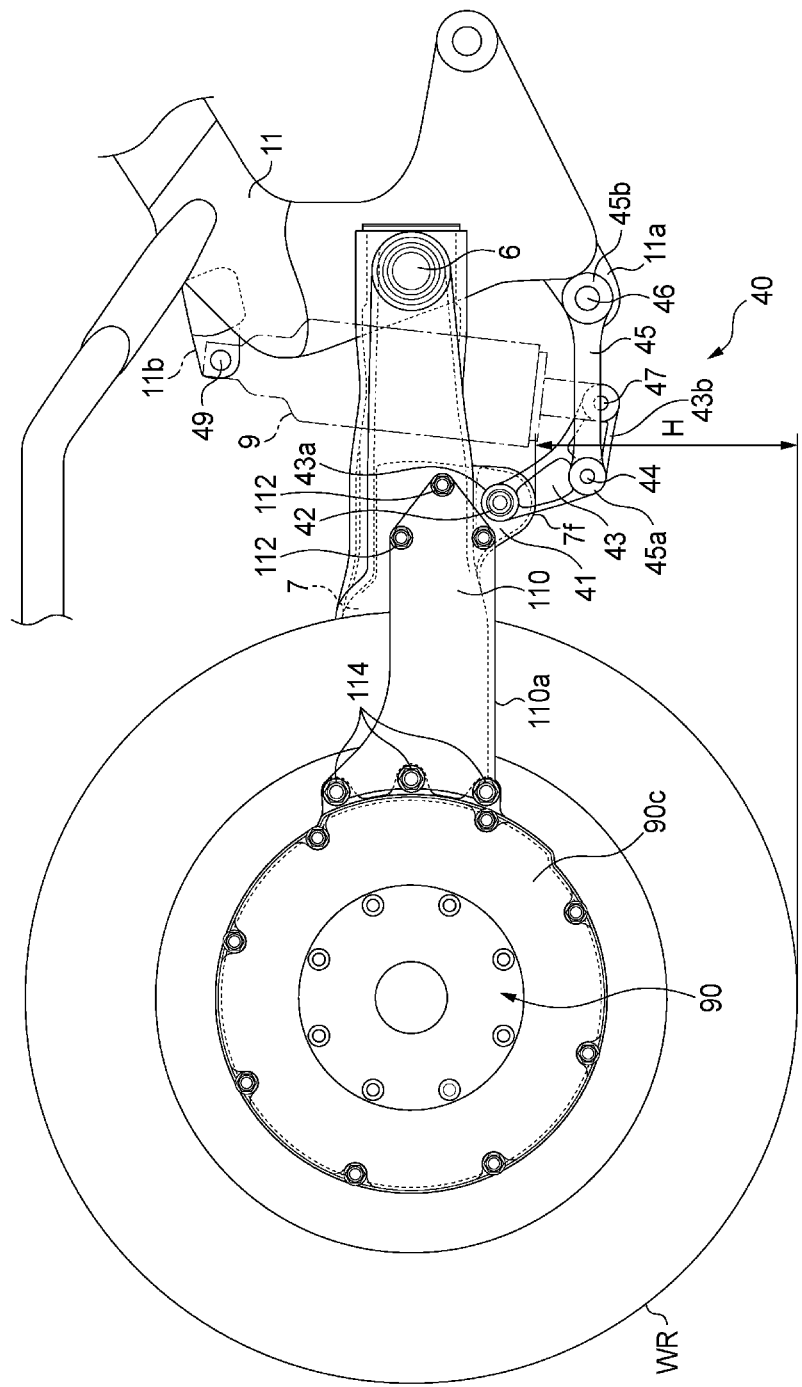
FIG. 3 is a right side view illustrating a rear wheel supported by a swing arm in FIG. 1.

A suspension link 40 includes, as illustrated in FIG. 3, a first link 43 connected to a stay 41 at one end portion 43a thereof by a shaft 42, and a second link 45 having one end 45a connected to an intermediate portion of the first link 43 by a shaft 44, and the other end 45b connected to a lower end portion 11a of the pivot plate 11 by a shaft 46. The other end 43b of the first link 43 is connected to an upper end portion 11b of the pivot plate 11 by a shaft 49. The rear cushion 9 penetrates a space 50 (see FIG. 4) formed at the front side of the swing arm 7.

Figure 4:
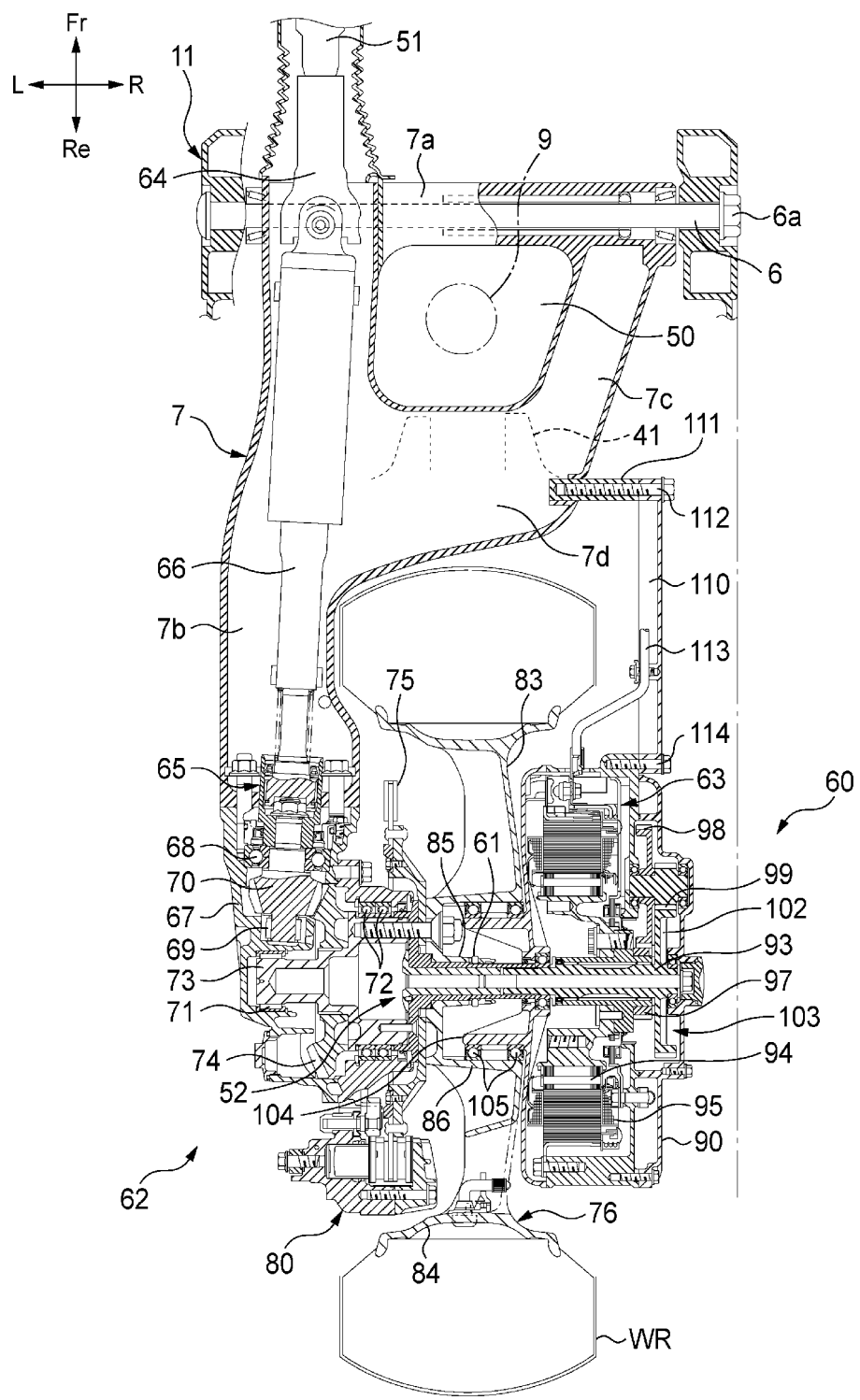
FIG. 4 is a partial cutaway view illustrating a rear-wheel driving mechanism in FIG. 1.

As illustrated in FIG. 4, the swing arm 7 is formed integrally with a support portion 7a swingably around the pivot plate 11 through the pivot shaft 6, a first arm portion 7b extending from one side (left side in FIG. 4) of the support portion 7a in a widthwise direction of the vehicle to a lateral side of the rear wheel WR, a second arm portion 7c extending from the other side (right side in FIG. 4) of the support portion 7a in the widthwise direction of the vehicle to the forward of the rear wheel WR, and a cross portion 7d connecting the rear portion of the second arm portion 7c and the intermediate portion of the first arm portion 7b in the widthwise direction of the vehicle. The swing arm 7 is hollow, and a drive shaft 66 which will be described later is accommodated in the first arm portion 7b, and passes above the support portion 7a to be connected to the output shaft 51.

Figure 5:
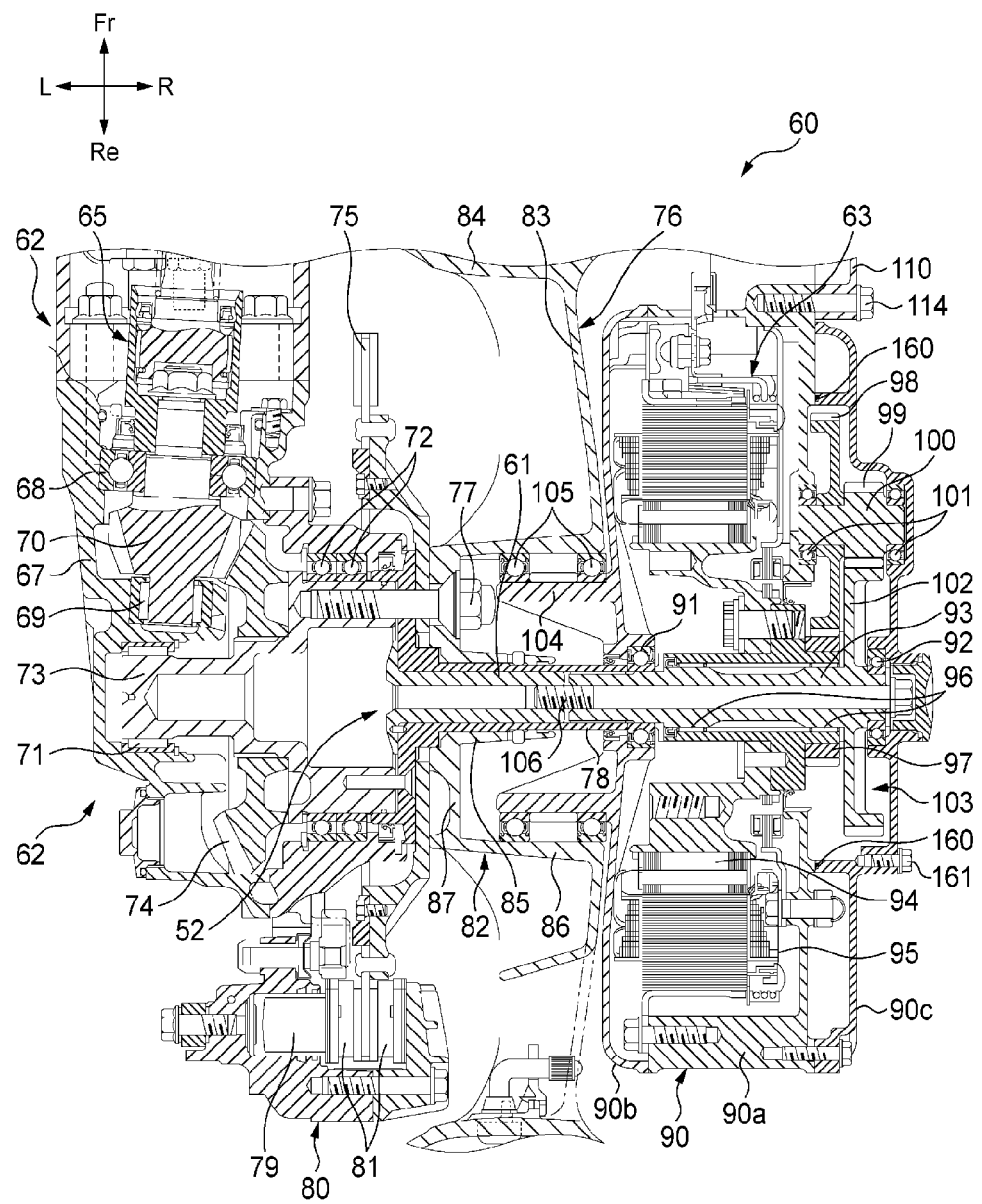
FIG. 5 is an enlarged view of a major portion of FIG. 4.
Figure 6:
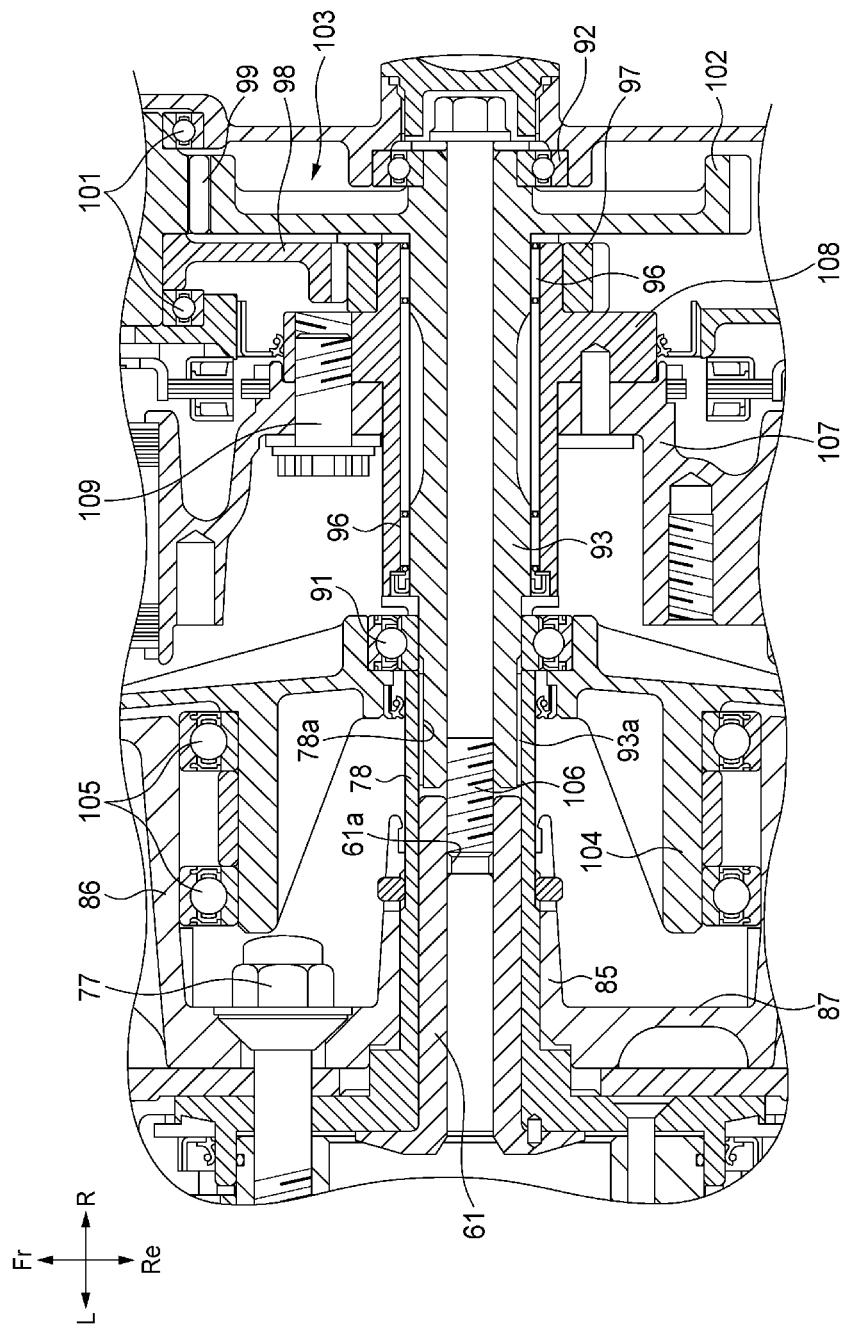
FIG. 6 is an enlarged view of a major portion of FIG. 5.

Next, the driving mechanism for the rear wheel WR will be described with reference to FIGS. 4 to 6. The driving mechanism 60 includes a drive power transmitting mechanism 62 for transmitting the power of the engine E from one side of the swing arm 7 in the widthwise direction of the vehicle to the drive shaft 52 of the rear wheel WR which will be described, and an electric motor 63 for transmitting the driving force from the other side of the swing arm 7 in the widthwise direction of the vehicle to the drive shaft 52.

The drive power transmitting mechanism 62 a drive shaft 66 having a front end portion connected to the output shaft 51 of the engine E through a universal joint 64 and a rear end portion provided with a constant velocity joint 67, a drive bevel gear 70 rotatably supported on the gear case 67 by a ball bearing 68 and a needle bearing 69, and a driven bevel gear 74 spline-fitted to a gear shaft 73 which is rotatably supported on the gear case 67 by the needle bearing 71 and a pair of ball bearings 72, and meshed with the drive bevel gear 70.

The gear shaft 73 is fastened to an outer sleeve 78 of the rear wheel WR, a disc-shaped brake disc 75, and a real wheel 76 of the rear wheel WR by a bolt 77. An inner sleeve 61 is coupled to the inside of the outer sleeve 78 by a pin, and thus is rotated integrally with the outer sleeve 78. The outer sleeve 78 is formed with a female-splined groove 78a at the portion extending more than the inner sleeve 61, and the female-splined groove 78a is fitted in a male-splined groove 93a formed in the outer circumference of the rotational shaft 93 of the electric motor 63 which will be described later. In this way, the drive shaft 52 including the inner and outer sleeves 61 and 78 is coupled to the rotational shaft 93 so as not to relatively rotate.

A disc brake device 80 is disposed on an outer circumferential side of the brake disc 75, and has a pair of brake pads 81 driven by a hydraulic cylinder 79 to pinch the brake disc 75.

The rear wheel 76 includes a wheel hub portion 82, a spoke portion 83 extending substantially radially outward from the wheel hub portion 82, and a rim portion 84 provided at a front end of the spoke portion 83 and holding the rear wheel WR. The wheel hub portion 82 has an inner cylindrical hub 85 spline-fitted in the outer circumference of outer sleeve 78, an outer hub 86 provided rather radially outward than the inner hub 85, and a sidewall 87 integrally connecting the inner hub 85 and an outer hub 86.

The electric motor 63 is disposed on the other side (right side in FIG. 4) of the swing arm 7 in the widthwise direction of the vehicle, and transmits the driving force to the drive shaft 52 of the rear wheel WR. Further, the rotational shaft 93 is rotatably supported on a pair of ball bearings 91 and 92 which are disposed on both ends of the motor housing 90, and one end of the rotational shaft 93 protrudes from the motor housing 90.

A rotor sleeve 108 is positioned on the rotational shaft 93 at a substantially center portion between the one ball bearings 91 and 91 and the other ball bearing 92, and is rotatably supported on a pair of needle bearings 96 at both ends thereof. A rotor core 107 of the rotor 94 is fastened to the rotor sleeve 108 by a bolt 109. A stator 95 is fixed to the motor housing 90 at an outer peripheral side of the rotor 94, with a slight gap being between the stator and the motor housing in a radial direction.

The motor housing 90 includes a housing body 90a for fixing the stator 95, and inner and outer housing covers 90b and 90c each fastened to the housing body 90a. The motor housing 90 is disposed farther rearward than the pivot shaft 6, and also farther inward than an end portion 6a of the pivot shaft 6 (see FIG. 4).

A drive gear 97 is fixed to the other side of the rotor sleeve 108 in the widthwise direction of the vehicle by welding. Further, an intermediate shaft 100 is rotatably supported between the housing body 90a and the outer housing cover 90c via a pair of ball bearings 101, and is provided with a large gear 98 and a small gear 99. The large gear 98 of the intermediate shaft 100 is meshed with a drive gear 97, and the small gear 99 of the intermediate shaft 100 is meshed with a driven gear 102 provided on the drive shaft 52. The drive gear 97, the large gear 98, the small gear 99, and the driven gear 102 configures the speed reduction mechanism 103, and the rotation of the rotor 94 is transmitted to the drive shaft 52 via the speed reduction mechanism 103 (the drive gear 97, the large gear 98, the small gear 99, and the driven gear 102). The contact surface between the housing body 90a and the outer housing cover 90c which defines a space for accommodating the speed reduction mechanism 103 therein is provided with an O-ring 160 for sealing the space. Meanwhile, in FIG. 5, reference numeral denotes a bolt for extracting oil from the space.

A cylindrical attachment 104 protrudes axially from the rear-wheel side of the inner housing cover 90b configuring the motor housing 90. The attachment 104 is fitted in the outer hub 86 of the rear wheel 76 via a pair of ball bearings 105, and the rear wheel 76 is supported to be rotatable relative to the motor housing 90.

Accordingly, in the state in which the attachment 104 of the motor housing 90 is fitted in the outer hub 86 and one end of the rotational shaft 93 protruding from the motor housing 90 is spline-fitted in the outer sleeve 78, a long-length bolt 106 which is inserted from the other end (right end) of the rotational shaft 93 is fastened to a female threaded portion 61a formed in the inner peripheral surface of the inner sleeve 61. In this way, the electric motor 63 is supported by the rear wheel 76, and the rotational shaft 93 of the electric motor 63 is connected to the drive shaft 52, so that the driving force of the electric motor 63 is transmitted to the drive shaft 52.

Further, one end portion of a connection member 110 extending in the front and rear direction is fastened to the motor housing 90 by a bolt 114. Specifically, one end portion of the connection member 110 is fastened to the housing body 90a at the front of the outer housing cover 90c. The other end portion of the connection member 110 is coupled to a connection boss 111 extending from the rear portion of the second arm portion 7c of the swing arm 7, more specifically, from the cross portion 7d to the other side in the widthwise direction of the vehicle, by a bolt 112. In this way, the rear wheel WR is supported in a double-sided support structure by the first arm portion 7b of the swing arm 7 in one side of the widthwise direction of the vehicle, and the connection member 110 connected to the swing arm 7. Furthermore, a bottom surface 110a of the connection member 110 is positioned higher than a bottom surface 7f of the swing arm 7 (see FIG. 3).

A plurality of three-phase lines 113 are held in the connection member 110 in the widthwise direction, and extend beyond the motor housing 90 from the stator 95. The three-phase lines 113 are connected to an inverter (not illustrated).

With the large motorcycle 1 including the above configuration, the driving force of the engine E is transmitted to the rear wheel WR via the drive shaft 66, the drive bevel gear 70, the driven bevel gear 74, the gear shaft 73, the drive shaft 52, and the rear wheel 76. Further, the driving force of the electric motor 63 is transmitted to the rear wheel WR via the drive gear 97 connected to the rotor sleeve 108, the large gear 98, the small gear 99, the driven gear 102, the drive shaft 52, and the rear wheel 76. Furthermore, if the driving force is transmitted from the driving wheel side at the time of deceleration of the vehicle, the electric motor 63 serves as a generator to generate a so-called regenerative braking force and recover kinetic energy of the vehicle as regenerative energy.

As described above, with the large motorcycle 1 according to this embodiment, the electric motor includes the motor housing 90 accommodating the stator 95 and the rotor 94 therein, and the rotational shaft 93 extending from the motor housing 90 and fitted in the drive shaft 52. One end of the motor housing 90 in the widthwise direction of the vehicle is supported on the outer hub 86 via a ball bearing 105 which is fitted with the outer hub 86 in a radially contacting manner, and the motor housing 90 is connected and fixed to the swing arm 7 by the connection member 110. Since the electric motor 63 is unitized and is directly connected to the drive shaft 52 of the rear wheel 76, the driving mechanism for the electric motor can be compact in size, and the design freedom of the electric motor can be improved as much as the size becomes compact. In addition, since the electric motor 63 can be incorporated later in the rear wheel WR, which has been already supported by the swing arm 7, in an add-on manner from the other side in the widthwise direction of the vehicle, the incorporating ability and maintenance of the electric motor 63 is improved. Further, since the drive shaft 52 and the rotational shaft 93 are fitted to each other, the driving force of the electric motor 63 can be transmitted to the drive shaft 52 of the rear wheel WR without passing through a plurality of transmission mechanisms, thereby suppressing the power loss in the transmission to a minimum.

Since the motor housing 90 is disposed rather rearward than the pivot shaft 6 of the swing arm 7 and rather inward than the end portion 6a of the pivot shaft 6, the electric motor 63 does not protrude from the vehicle 1 in the widthwise direction thereof, but is disposed in compact.

Further, since connection member 110 is disposed rather upward than the bottom surface 7f of the swing arm 7, a height-above-a-ground of the swing arm 7 can be set to a minimum height-above-the-ground H.

Since the rear wheel WR is supported in the double-sided structure by the swing arm 7 and the connection member 110, the rear arm has high rigidity and distortion of the swing arm 7 is prevented.

The rotor 94 is rotatably supported on the rotational shaft 93 of the electric motor 63, and the rotation of the rotor 94 is decelerated by the speed reduction mechanism 103 disposed outside the rotational shaft 93 in the widthwise direction of the vehicle and then is transmitted to the rotational shaft 93. As a result, the heavy rotor 94 can be disposed at the center of the rotational shaft 93 in the axial direction, and the load applied to the rotational shaft 93 can be equalized, thereby suppressing the vibration of the rotational shaft 93.

Second Embodiment

Figure 7:
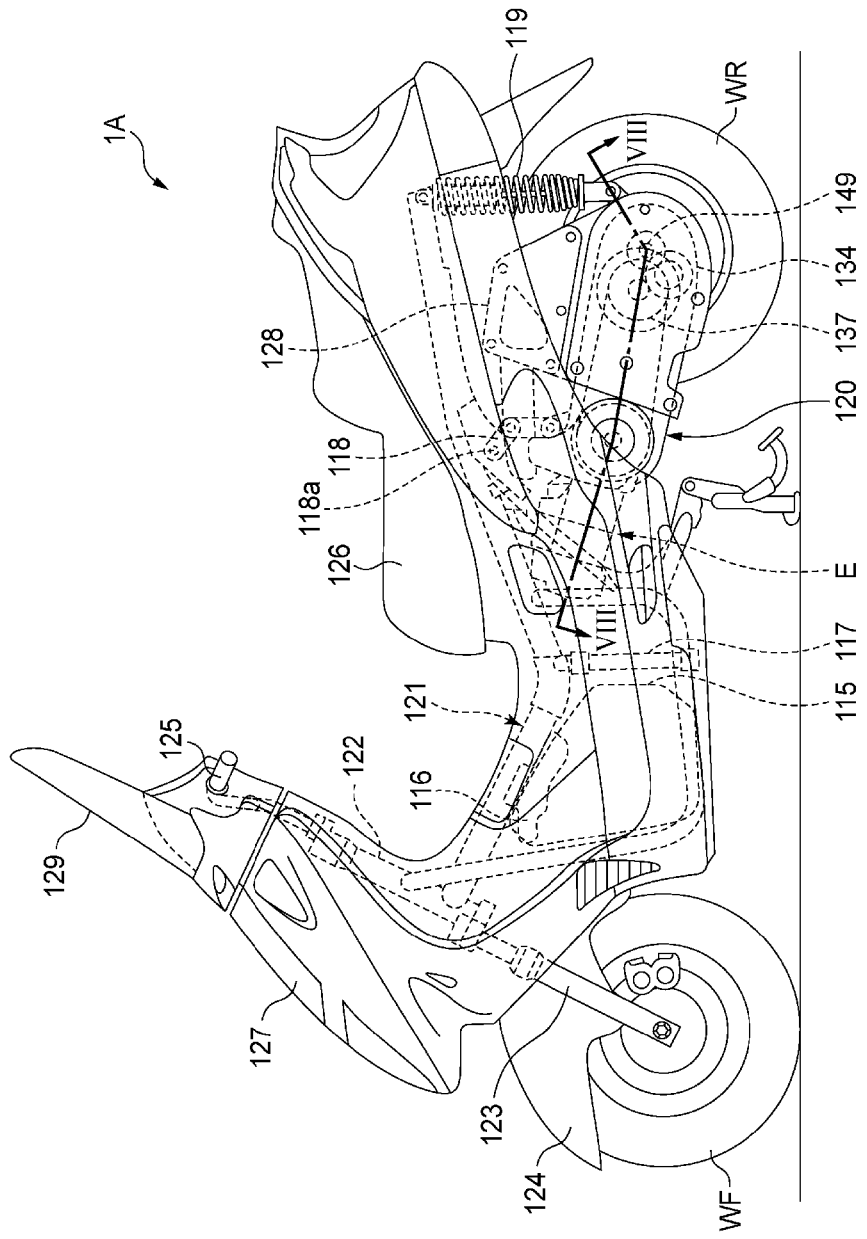
FIG. 7 is a side view illustrating a hybrid saddle-type vehicle according to a second embodiment of the inventions.

Next, a hybrid saddle-type vehicle according to a second embodiment of the inventions will be described with reference to FIGS. 7 and 8. The same reference numerals have been used to identify the same or similar elements as those of the first embodiment, and the description thereof will be omitted or in brief herein.

The hybrid saddle-type vehicle of this embodiment is a scooter type motorcycle 1A including a unit swing type internal combustion engine (hereinafter, referred to a power unit) 120. As illustrated in FIG. 7, the scooter motorcycle 1A includes a cradle type body frame 121, a front fork 123 pivotably mounted to a head pipe 122 of the body frame 121, a front wheel WF and a front fender 124 which are attached to a lower end portion of the front fork 123, a handle 125 connected to an upper end portion of the front fork 123, a fuel tank 115 disposed in a cradle space enclosed by each frame of the body frame 121, a reserve tank 116 for a radiator, a radiator 117, a power unit 120 disposed at the rearward of the cradle space and having an engine and a drive power transmitting mechanism 130, a link mechanism 118 for suspending a rear end portion of the power unit 120 from the body frame 121, a rear cushion 119 for suspending a rear end portion of the power unit 120 from the body frame 121, a rear wheel WR attached to a rear portion of the power unit 120, a seat 126 disposed on an upper portion of the body frame 121, and a cover 127 extending from a front portion of the body frame 121 to a rear portion over the whole length to cover desired portions of the vehicle including upper and lower surfaces, front and rear surfaces, and left and right lateral surfaces.

The portion of the cover 127 extending from the center portion of the vehicle to the rear portion covers the engine E of the power unit 120, and a portion of an air cleaner 128, and is elongated rearward and obliquely upwardly. The front end portion of the cover 127 is provided with a windscreen 129 which covers the forward of the handle 125.

Figure 8:
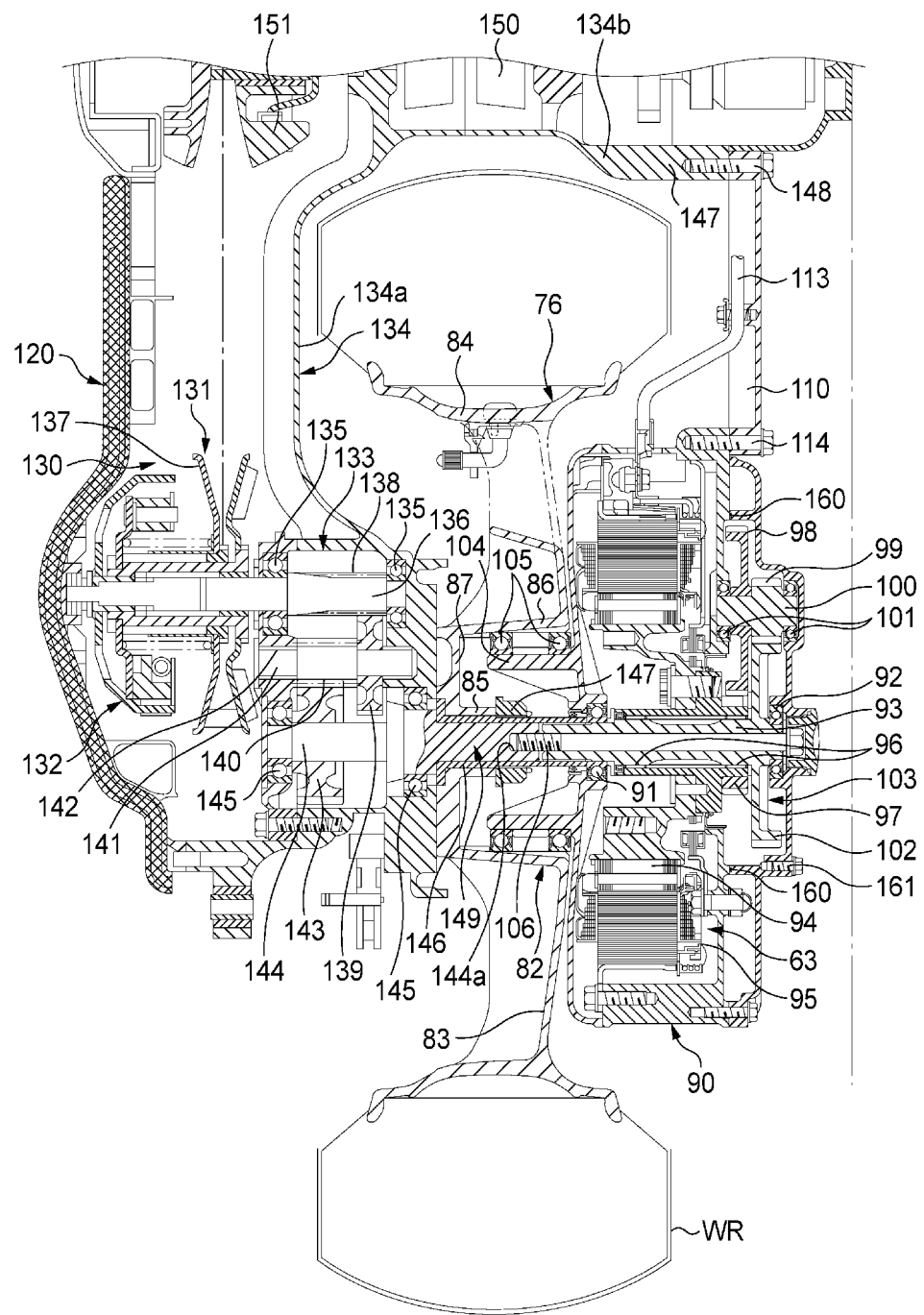
FIG. 8 is a cross-sectional view taken along the line VIII-VIII in FIG. 7.

As illustrated in FIG. 8, the power unit 120 is disposed on one side (right side in FIG. 8) of the scooter type motorcycle in a widthwise direction of the vehicle, and transmits the power from the engine E to a drive shaft 149 of the rear wheel WR. Further, an electric motor 63 is disposed on the other side (right side in FIG. 8) of the rear wheel WR in the widthwise direction of the vehicle to transmit the driving force to the rear wheel WR.

The power unit 120 includes the engine E and a drive power transmitting mechanism 130 for transmitting the output of the engine E to the rear wheel WR. The engine E is an overhead cam (OHC) internal combustion engine, and if a piston reciprocates in a cylinder, the reciprocating movement is converted into a rotational movement of a crank shaft 150 via a connecting rod. A left end of the crank shaft 150 is connected to a drive-side pulley 151 of a V-belt automatic transmission 131.

The drive power transmitting mechanism 130 includes the V-belt automatic transmission 131, a centrifugal clutch 132, and a gear reduction device 133. A unit swing case 134 includes a transmission case unit 134a accommodating the above components of the drive power transmitting mechanism therein, and a crankcase portion 134b covering a connecting rod of the engine E and the crank shaft 150 which is formed integrally with the transmission case unit. The unit swing case 134 is swingably mounted on the body frame 121 by the link mechanism 118 via a pivot shaft 118a (see FIG. 7).

A primary shaft 136 is rotatably supported in the unit swing case 134 via a pair of ball bearings 135, and a driven-side pulley 137 of the V-belt automatic transmission 131 is rotatably fitted in the primary shaft 136. The centrifugal clutch 132 is disposed on one side in the widthwise direction of the vehicle, while a spur gear 138 is provided at the other side in the widthwise direction of the vehicle. Further, an intermediate shaft 141 having a large-diameter gear 139 and a small-diameter gear 140 is rotatably supported in the unit swing case 134 via a needle bearing 142, and also a final shaft 144 having a drive gear 143 is rotatably supported via a pair of ball bearings 145. In this way, in the gear reduction device 133, the driving force transmitted to the spur gear 138 is transmitted to the large-diameter gear 139, and then is also transmitted to the drive gear 143 which is meshed with the small-diameter gear 140. The final shaft 144 protrudes from the unit swing case 134 towards the other side in the widthwise direction of the vehicle.

A sleeve 146 extending not to the final shaft 144 but to the electric motor 63 side is coupled to an outer circumference of the final shaft 144 by a pin, and thus is rotated integrally with the final shaft 144. As described in the first embodiment, the rotational shaft 93 of the electric motor 63 is spline-fitted in the sleeve 146, and the drive shaft 149 is coupled to the rotational shaft 93 so as not to relatively rotate.

An inner hub 85 of the rear wheel 76 is spline-fitted in the sleeve 146, and is fixed to the sleeve 146 by fastening a nut 147.

The electric motor 63 is configured identically as in the first embodiment, and is disposed at the other side (right side in FIG. 8) of the unit swing case 134 in the widthwise direction of the vehicle to transmit the driving force to the drive shaft 149 of the rear wheel WR.

Accordingly, in the state in which the attachment 104 of the motor housing 90 is fitted in the outer hub 86 via the pair of ball bearings 105 and one end of the rotational shaft 93 protruding from the motor housing 90 is spline-fitted in the outer sleeve 78, the long-length bolt 106 which is inserted from the other end (right end) of the rotational shaft 93 is fastened to a female threaded portion 144a formed in the inner peripheral surface of the final shaft 144. In this way, the electric motor 63 is supported by the rear wheel 76, and the rotational shaft 93 of the electric motor 63 is connected to the drive shaft 149, so that the driving force of the electric motor 63 is transmitted to the drive shaft 149.

The motor housing 90 is disposed rather rearward than the other end portion of the crank case portion 134b of the unit swing case 134 in the widthwise direction of the vehicle, and rather inward than the other end in the widthwise direction of the vehicle (see FIG. 8). Furthermore, the connection member 110 connected to the motor housing 90 is connected to a connection protrusion 147 provided on the crankcase portion 134b by a bolt 148. In this way, the rear wheel WR is supported in a double-sided structure by the transmission case portion 134a provided at one side of the unit swing case 134 in the widthwise direction of the vehicle, and the connection member 110 connected to the unit swing case 134. Although not illustrated, the bottom surface of the connection member 110 is positioned rather upward than the bottom surface of the unit swing case 134.

With the scooter type motorcycle 1A including the above configuration, the driving force of the engine E is transmitted to the rear wheel WR via the V-belt automatic transmission 131, the centrifugal clutch 132, the gear reduction device 133, the drive shaft 144, and the rear wheel 76. Further, the driving force of the electric motor 63 is transmitted to the rear wheel WR via the drive gear 97 connected to the rotor sleeve 108, the large gear 98, the small gear 99, the driven gear 102, the drive shaft 144, and the rear wheel 76. Furthermore, if the driving force is transmitted from the driving wheel side at the time of deceleration of the vehicle, the electric motor 63 serves as a generator to generate a so-called regenerative braking force and recover kinetic energy of the vehicle 1A as regenerative energy.

Accordingly, with the scooter type motorcycle 1A according to this embodiment, since the electric motor 63 is unitized and is directly connected to the drive shaft 149 of the rear wheel WR, the driving mechanism for the electric motor 63, and the electric motor 63 can be incorporated later in the rear wheel WR, which has been already supported by the swing case 134, in an add-on manner from the other side in the widthwise direction of the vehicle, the incorporating ability and maintenance of the electric motor 63 is improved. Further, since the drive shaft 149 and the rotational shaft 93 are fitted to each other, the driving force of the electric motor 63 can be transmitted to the drive shaft 149 of the rear wheel WR without passing through a plurality of transmission mechanisms, thereby suppressing the power loss in the transmission to a minimum.

Other configuration and operation are the same as those of the first embodiment.

The inventions are not limited to the above-described embodiments, and modifications and variations can be appropriately made.

According to the inventions, if only the drive shaft and the rotational shaft are fitted to each other for transmitting the driving force from the electric motor, the fitting method is not limited to those of the embodiments.

DESCRIPTION OF REFERENCE NUMERALS

1 Large motorcycle (Hybrid saddle-type vehicle)
1A Scooter type motorcycle (Hybrid saddle-type vehicle)

2 Body frame
6 Pivot shaft
6a End portion
7 Swing arm
7a Support portion
7b First arm portion
7c Second arm portion
7d Cross portion
7f Bottom surface
52, 149 Drive shaft
61 Inner sleeve
62, 130 Power transmission mechanism
63 Electric motor
73 Gear shaft
78 Outer sleeve
82 Wheel hub portion
85 Inner hub
86 Outer hub
90 Motor housing
93 Rotational shaft
94 Rotor
95 Stator
103 Speed reduction mechanism
110 Connection member
110a Bottom surface
118 Link mechanism
121 Cradle type body frame (Body frame)
134 Unit swing case (Rear wheel support member)
E Engine (Internal combustion engine)
WR Rear wheel

The invention claimed is:

1. A hybrid vehicle having a saddle, comprising:
a rear-wheel supporting member swingably attached to a body frame and adapted to support a rear wheel;
a drive power transmitting mechanism adapted to transmit a power of an internal combustion engine from one side of the rear-wheel supporting member in a widthwise direction of the vehicle to a drive shaft of the rear wheel; and
an electric motor adapted to transmit a driving force from an opposite side of the rear-wheel supporting member in the widthwise direction of the vehicle to the drive shaft of the rear wheel,
wherein the rear wheel includes a wheel hub portion having an inner cylindrical hub provided on a side of the drive shaft and a cylindrical outer hub provided in a radially outer side of the inner hub,
wherein the electric motor includes a motor housing accommodating a stator and a rotor therein, and a rotational shaft extending from the motor housing and the drive shaft have a common axis and an end of rotational shaft is connected to an end of the drive shaft at a position surrounded by the cylindrical outer hub, and
wherein one end portion of the motor housing in the widthwise direction is supported on the outer hub via a bearing which is fitted with the cylindrical outer hub in a radially contacting manner, and the motor housing is fixedly connected to the rear-wheel supporting member by a connection member.

2. The hybrid vehicle having a saddle, according to claim 1, wherein the rear-wheel supporting member is a swing arm which is swingably supported on the body frame via a pivot shaft.

3. The hybrid vehicle having a saddle, according to claim 2, wherein the motor housing is disposed rearwardly of the pivot shaft and inwardly of an end portion of the pivot shaft.

4. The hybrid vehicle having a saddle, according to claim 2, wherein the connection member is disposed upwardly of a bottom surface of the swing arm.

5. The hybrid vehicle having a saddle, according to claim 2, wherein the swing arm includes:
a laterally extending support portion surrounding the pivot shaft,
a first arm portion extending rearwardly from one end of the support portion in the widthwise direction of the vehicle, to a position along one lateral side of the rear wheel,
a second arm portion extending rearwardly from an opposite end of the support portion, to a rear portion thereof positioned forwardly of the rear wheel, and
a cross portion extending in the widthwise direction of the vehicle in order to connect the rear portion of the second arm portion to an intermediate portion of first arm portion, and
wherein the connection member is connected to the rear portion of the second arm portion, from which the cross portion extends in the widthwise direction of the vehicle to the intermediate portion of the first arm portion.

6. The hybrid vehicle having a saddle, according to claim 1, wherein the rear-wheel supporting member is a unit swing case which is swingably supported on the body frame via a link mechanism and covers the internal combustion engine.

7. The hybrid vehicle having a saddle, according to claim 1, wherein the electric motor further includes a speed reduction mechanism adapted to decelerate the driving force and transmit it to the rotational shaft, and
wherein the rotor is rotatably supported around the rotational shaft, and the speed reduction mechanism is disposed on the other side of the rotational shaft in the widthwise direction.

8. A hybrid vehicle having a saddle, comprising:
a rear-wheel supporting member swingably attached to a body frame and adapted to support a rear wheel;
a drive power transmitting mechanism adapted to transmit a power of an internal combustion engine from one side of the rear-wheel supporting member in a widthwise direction of the vehicle to a drive shaft of the rear wheel; and
an electric motor adapted to transmit a driving force from an opposite side of the rear-wheel supporting member in the widthwise direction of the vehicle to the drive shaft of the rear wheel,
wherein the rear wheel includes a wheel hub portion having an inner cylindrical hub provided on a side of the drive shaft and a cylindrical outer hub provided in a radially outer side of the inner hub,
wherein the electric motor includes a motor housing accommodating a stator and a rotor therein, and a rotational shaft extending from the motor housing and having an end fitted to an end of the drive shaft, and
wherein one end portion of the motor housing in the widthwise direction is supported on the outer hub via a bearing which is fitted with the cylindrical outer hub in a radially contacting manner, and the motor housing is fixedly connected to the rear-wheel supporting member by a connection member,
wherein the rear-wheel supporting member is a swing arm which is swingably supported on the body frame via a pivot shaft,
wherein the swing arm includes:
a laterally extending support portion surrounding the pivot shaft, a first arm portion extending rearwardly from one end of the support portion in the widthwise direction of the vehicle, to a position along one lateral side of the rear wheel, a second arm portion extending rearwardly from an opposite end of the support portion, to a rear portion thereof positioned forwardly of the rear wheel, and a cross portion extending in the widthwise direction of the vehicle in order to connect the rear portion of the second arm portion to an intermediate portion of first arm portion, and wherein the connection member is connected to the rear portion of the second arm portion, from which the cross portion extends in the widthwise direction of the vehicle to the intermediate portion of the first arm portion.

* * * * *